United States Patent
Masumoto

(10) Patent No.: US 10,089,727 B2
(45) Date of Patent: Oct. 2, 2018

(54) MAGNETIC FIELD DISTORTION CALCULATION DEVICE, METHOD, AND PROGRAM

(71) Applicant: FUJIFILM Corporation, Tokyo (JP)

(72) Inventor: Jun Masumoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/633,104

(22) Filed: Jun. 26, 2017

(65) Prior Publication Data

US 2018/0061022 A1   Mar. 1, 2018

(30) Foreign Application Priority Data

Aug. 23, 2016   (JP) ................. 2016-162464

(51) Int. Cl.
| | |
|---|---|
| G06K 9/00 | (2006.01) |
| G06T 5/00 | (2006.01) |
| G06T 7/38 | (2017.01) |
| G06T 7/00 | (2017.01) |
| G06T 7/30 | (2017.01) |
| A61B 5/05 | (2006.01) |

(52) U.S. Cl.
CPC ............. *G06T 5/006* (2013.01); *G06T 7/30* (2017.01); *G06T 7/38* (2017.01); *G06T 7/97* (2017.01); *G06T 2207/10088* (2013.01); *G06T 2207/20* (2013.01); *G06T 2207/30016* (2013.01)

(58) Field of Classification Search
USPC ....... 382/100, 103, 128–134, 154, 162, 168, 382/173, 181, 190, 199, 219, 232, 254, 382/274, 276, 286–291, 305, 320, 260; 600/407, 410; 378/4, 21
See application file for complete search history.

(56) References Cited

U.S. PATENT DOCUMENTS

| | | | |
|---|---|---|---|
| 2003/0216631 A1* | 11/2003 | Bloch ................... | G06T 3/0081 |
| | | | 600/407 |
| 2008/0085041 A1* | 4/2008 | Breeuwer ............... | G06T 5/006 |
| | | | 382/128 |

(Continued)

FOREIGN PATENT DOCUMENTS

| | | |
|---|---|---|
| JP | 11-9708 A | 1/1999 |
| JP | 2008-521471 A | 6/2008 |

(Continued)

*Primary Examiner* — Seyed Azarian
(74) *Attorney, Agent, or Firm* — Birch, Stewart, Kolasch & Birch, LLP

(57) ABSTRACT

A region extraction unit extracts first and second shape-invariant regions corresponding to each other from first and second three-dimensional images acquired by an MRI apparatus. A first registration unit acquires a first deformation vector by performing rigid registration between the first and second shape-invariant regions. A second registration unit acquires a second deformation vector by performing non-rigid registration between the first and second three-dimensional images in each shape-invariant region. A magnetic field distortion vector calculation unit calculates a magnetic field distortion vector, which represents relative magnetic field distortion between the first and second three-dimensional images based on the first and second deformation vectors.

7 Claims, 12 Drawing Sheets

(56) References Cited

U.S. PATENT DOCUMENTS

| | | | |
|---|---|---|---|
| 2013/0251218 A1* | 9/2013 | Eriksson Jarliden | ........................ G06T 7/0024 382/128 |
| 2014/0153797 A1* | 6/2014 | Wan | ...................... G06T 3/0068 382/128 |
| 2014/0357978 A1* | 12/2014 | Pai | ...................... A61B 5/0042 600/410 |

FOREIGN PATENT DOCUMENTS

| JP | 2012-161354 A | 8/2012 |
|---|---|---|
| JP | 2014-108349 A | 6/2014 |

* cited by examiner

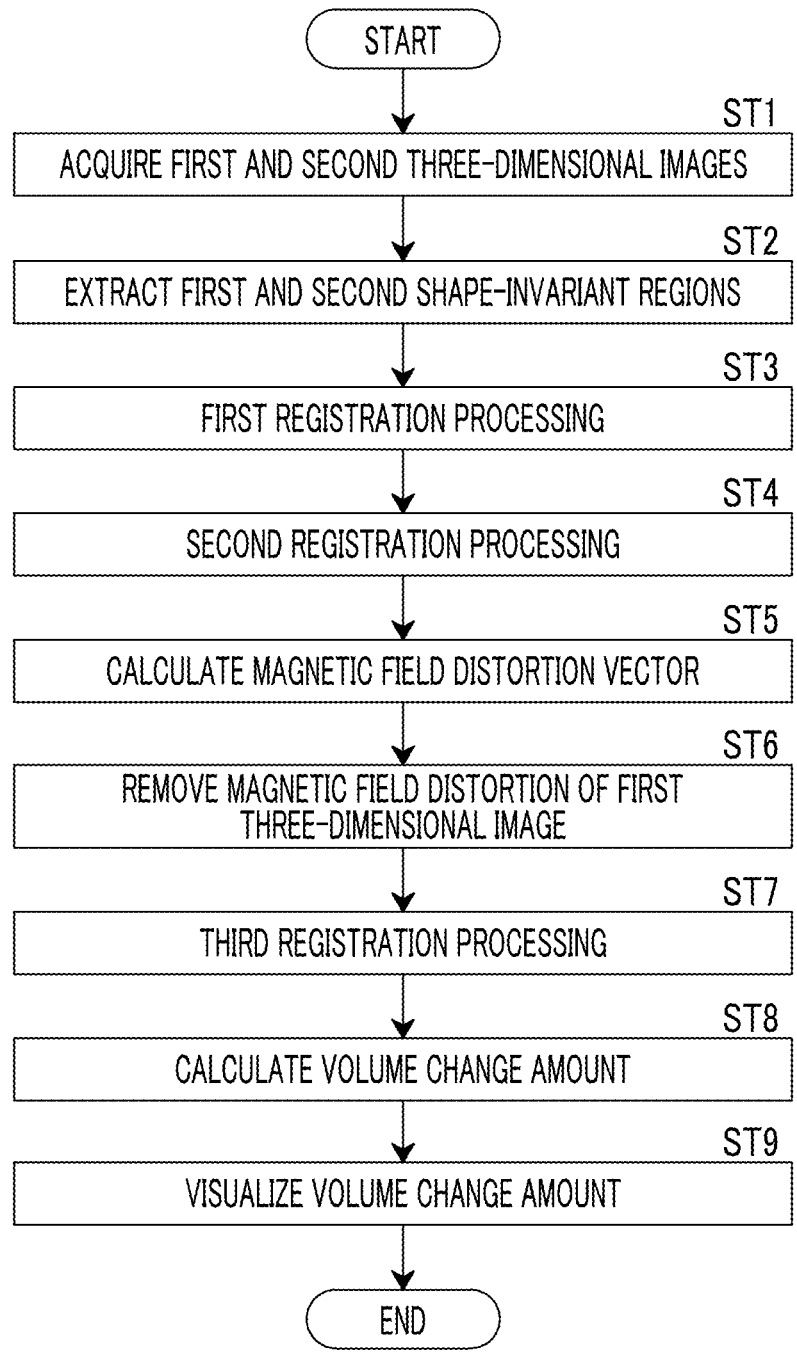

MAGNETIC FIELD DISTORTION CALCULATION DEVICE, METHOD, AND PROGRAM

CROSS REFERENCE TO RELATED APPLICATIONS

The present application claims priority under 35 U.S.C. § 119 to Japanese Patent Application No. 2016-162464 filed on Aug. 23, 2016. The above application is hereby expressly incorporated by reference, in its entirety, into the present application.

BACKGROUND

Field of the Invention

The present invention relates to a magnetic field distortion calculation device, method, and program for calculating magnetic field distortion included in a three-dimensional image acquired by a magnetic resonance imaging (MRI) apparatus.

Description of the Related Art

In recent years, due to advances in medical apparatuses such as computed tomography (CT) apparatuses and MRI apparatuses, high-quality three-dimensional images with high resolution are used for image diagnosis. Here, the CT apparatus can image the inside of the body of a subject in a short time. Accordingly, the CT apparatus is used for early detection of a disease and surgical planning in many cases. On the other hand, the MRI apparatus requires longer imaging time than the CT apparatus, but is advantageous in that there is no exposure to the subject. The MRI apparatus is an apparatus that images the shapes of the head, abdomen, and the like inside a human body, which is a subject, in a three-dimensional manner by applying a gradient magnetic field to the human body and measuring a nuclear magnetic resonance signal generated by atomic nuclear spins forming the tissue of the human body.

However, in the MRI image acquired by the MRI apparatus, geometric distortion due to an apparatus and geometric distortion (referred to as magnetic field distortion) due to a subject occur due to non-uniformity in a static magnetic field and incompleteness in a gradient magnetic field. Such magnetic field distortion is allowed to some extent. However, if the magnetic field distortion is included in two MRI images with different imaging timings for follow-up on the same subject, it is not possible to accurately determine the progress. In particular, in a case where the subject is an Alzheimer patient, the atrophy rate of the entire brain is 1% to 3% a year, while the atrophy rate of the entire brain of a normal person is less than 1% a year. For this reason, in the follow-up of Alzheimer's disease, it is necessary to accurately recognize which portion of the brain is atrophied to what extent by comparing an MRI image acquired at the time of previous diagnosis and the latest MRI image. However, if magnetic field distortion is included in the MRI image, it is not possible to distinguish whether the recognized atrophy of the brain is caused by the progress of the disease or by the magnetic field distortion. For this reason, various methods for correcting the magnetic field distortion have been proposed.

For example, a method of correcting the magnetic field distortion of an MRI image by calculating a gradient magnetic field strength in an imaging cross section in the space based on the pattern of a coil forming a gradient magnetic field generator and calculating magnetic field distortion using the gradient magnetic field strength has been proposed (refer to JP2012-161354A). In addition, a method of correcting an acquired MRI image by calculating magnetic field distortion using a phantom for measuring distortion and imaging the subject using the calculated magnetic field distortion has also been proposed (refer to JP1999-9708A (JP-H11-9708A) and JP2008-521471A). By using these methods, it is possible to correct the magnetic field distortion included in the MRI image.

On the other hand, as described above, for follow-up on the same subject, it is necessary to detect a changed portion and the amount of change from the previous time by accurately performing registration between two images with different imaging timings. Therefore, as a general image registration method, a method has been proposed in which rigid registration between two images is performed to acquire a deformation vector field representing global deformation between the images as first deformation information and non-rigid registration between the two images is performed using the first deformation information as initial deformation information, thereby acquiring a deformation vector field representing local deformation between the two images (refer to JP2014-108349A).

SUMMARY

On the other hand, in the MRI apparatus, magnetic field distortion may become worse due to aged deterioration of the apparatus. For this reason, in the methods disclosed in JP2012-161354A, JP1999-9708A (JP-H11-9708A), and JP2008-521471A, it is necessary to perform a calibration for measuring magnetic field distortion, for example, every predetermined period, such as half a year or one year. However, it requires very long time to measure the magnetic field distortion every predetermined period. Immediately after the calibration, the magnetic field distortion of the MRI image can be corrected with high accuracy. However, if the elapsed time after the calibration is long, a possibility that the actual magnetic field distortion is different from the measured magnetic field distortion is very high. Therefore, it is not possible to accurately correct the magnetic field distortion. In addition, the method disclosed in JP2014-108349A is not intended to correct the magnetic field distortion of the MRI image but combines rigid registration and non-rigid registration. However, it is not possible to perform registration by which the magnetic field distortion of the MRI image is corrected.

The present invention has been made in view of the above circumstances, and it is an object of the present invention to correct magnetic field distortion included in an MRI image without performing a calibration.

A magnetic field distortion calculation device according to the present invention comprises: image acquisition unit for acquiring first and second three-dimensional images with different imaging timings that are acquired by imaging a target part of a subject using an MRI apparatus; region extraction unit for extracting first and second shape-invariant regions corresponding to each other from the first and second three-dimensional images; first registration unit for acquiring a first deformation vector of each point on the first shape-invariant region with respect to each corresponding point on the second shape-invariant region by performing rigid registration between the first and second shape-invariant regions; second registration unit for acquiring a second deformation vector of each point on the first shape-invariant region of the first three-dimensional image with respect to each corresponding point on the second shape-invariant region of the second three-dimensional image by performing non-rigid registration between the first and second three-dimensional images in the first and second shape-invariant regions; and magnetic field distortion vector calculation unit for calculating a magnetic field distortion vector, which represents relative magnetic field distortion between the first and second three-dimensional images, at each point on the first three-dimensional image based on the first and second deformation vectors.

"Rigid registration" is registration in a case where it is assumed that the registration target is not deformed. For example, by performing rigid registration in the entire three-dimensional image, a vector representing parallel movement and rotation at each point on the first three-dimensional image with respect to the second three-dimensional image can be acquired as the first deformation vector. That is, the rigid registration does not include registration of local nonlinear deformation between three-dimensional images.

"Non-rigid registration" is registration in a case where the registration target is deformed. By the non-rigid registration, it is possible to perform registration including non-linear deformation between three-dimensional images (for example, local distortion of an image). Regions to be subjected to non-rigid registration may be only the first and second shape-invariant regions or may be regions in the first and second shape-invariant regions including the first and second shape-invariant regions. "Each point" may be all pixel positions (voxel positions) on the three-dimensional image, or may be pixel positions thinned out at predetermined intervals.

In the magnetic field distortion calculation device according to the present invention, the magnetic field distortion vector calculation unit may calculate a third deformation vector, which is acquired by correcting the second deformation vector in the first shape-invariant region based on the first deformation vector, as the magnetic field distortion vector in the first shape-invariant region, and calculate the magnetic field distortion vector based on the third deformation vector in a region other than the first shape-invariant region in the first three-dimensional image.

The magnetic field distortion calculation device according to the present invention further comprises third registration unit for calculating a fourth deformation vector of each point of the target part, which is included in the first three-dimensional image, with respect to each corresponding point of the target part included in the second three-dimensional image by removing magnetic field distortion included in the first three-dimensional image based on the magnetic field distortion vector and performing non-rigid registration between the first three-dimensional image from which the magnetic field distortion has been removed and the second three-dimensional image.

In this case, the magnetic field distortion calculation device according to the present invention may further comprise change amount calculation unit for calculating an amount of change in volume of the target part based on the fourth deformation vector.

In the magnetic field distortion calculation device according to the present invention, a target part may be a brain. In this case, the first and second shape-invariant regions may be a skull.

A magnetic field distortion calculation method according to the present invention comprises: acquiring first and second three-dimensional images with different imaging timings that are acquired by imaging a target part of a subject using an MRI apparatus; extracting first and second shape-invariant regions corresponding to each other from the first and second three-dimensional images; acquiring a first deformation vector of each point on the first shape-invariant region with respect to each corresponding point on the second shape-invariant region by performing rigid registration between the first and second shape-invariant regions; acquiring a second deformation vector of each point on the first shape-invariant region of the first three-dimensional image with respect to each corresponding point on the second shape-invariant region of the second three-dimensional image by performing non-rigid registration between the first and second three-dimensional images in the first and second shape-invariant regions; and calculating a magnetic field distortion vector, which represents relative magnetic field distortion between the first and second three-dimensional images, at each point on the first three-dimensional image based on the first and second deformation vectors.

In addition, a program causing a computer to execute the magnetic field distortion calculation method according to the present invention may be provided.

According to the present invention, the first and second shape-invariant regions corresponding to each other are respectively extracted from the first and second three-dimensional images, and the first deformation vector of the first shape-invariant region with respect to the second shape-invariant region is acquired by performing rigid registration between the first and second shape-invariant regions. In addition, the second deformation vector at each point on the first three-dimensional image with respect to the second three-dimensional image is acquired by performing non-rigid registration between the first and second three-dimensional images in the first and second shape-invariant regions. Then, the magnetic field distortion vector, which represents the relative magnetic field distortion between the first and second three-dimensional images, at each point on the first three-dimensional image is calculated based on the first and second deformation vectors.

Although the first and second shape-invariant regions in the subject are regions that are not actually deformed, the first shape-invariant region included in the first three-dimensional image is deformed with respect to the second shape-invariant region included in the second three-dimensional image due to the influence of magnetic field distortion when acquiring the first and second three-dimensional images. The first deformation vector acquired in the present invention represents a positional deviation due to parallel movement and rotation of the first shape-invariant region with respect to the second shape-invariant region. On the other hand, the second deformation vector includes a positional deviation due to parallel movement and rotation of the first shape-invariant region with respect to the second shape-invariant region and deformation due to relative magnetic field distortion between the first and second three-dimensional images.

Therefore, based on the first and second deformation vectors, it is possible to calculate the deformation due to the relative magnetic field distortion between the first and second three-dimensional images, that is, the magnetic field distortion vector, without periodically performing a calibration for measuring the magnetic field distortion using a phantom or the like.

BRIEF DESCRIPTION OF THE DRAWINGS

FIG. 15 is a flowchart showing a process performed in the present embodiment.

DESCRIPTION OF THE PREFERRED EMBODIMENTS

Figure 1:
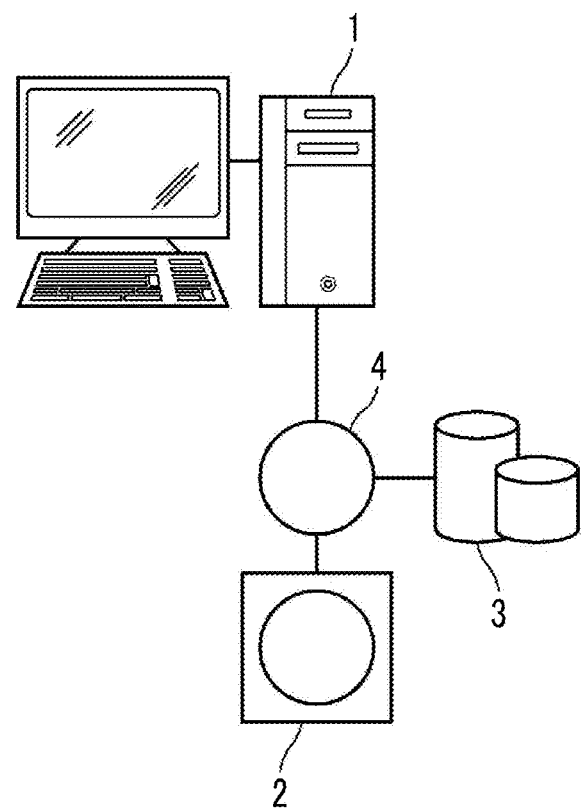
FIG. 1 is a hardware configuration diagram showing an overview of a diagnosis assistance system to which a magnetic field distortion calculation device according to a first embodiment of the present invention is applied.

Hereinafter, embodiments of the present invention will be described with reference to the diagrams. FIG. 1 is a hardware configuration diagram showing an overview of a diagnosis assistance system to which a magnetic field distortion calculation device according to a first embodiment of the present invention is applied. As shown in FIG. 1, in the diagnosis assistance system, a magnetic field distortion calculation device 1 according to the present embodiment, a three-dimensional imaging apparatus 2, and an image storage server 3 are communicably connected to each other through a network 4. Then, in the diagnosis assistance system, the magnetic field distortion calculation device 1 compares two three-dimensional images with different imaging timings for comparative diagnosis of a diagnosis target part of the subject.

The three-dimensional imaging apparatus 2 is an apparatus that generates a three-dimensional image showing a part, which is a diagnosis target part of the subject, by imaging the part. In the present embodiment, the three-dimensional imaging apparatus 2 is an MRI apparatus. The three-dimensional image generated by the three-dimensional imaging apparatus 2 is transmitted to the image storage server 3 and is stored therein. In the present embodiment, it is assumed that the diagnosis target part of the subject is the brain and the three-dimensional imaging apparatus 2 generates a three-dimensional image of the head of the subject.

Here, the three-dimensional image acquired by the MRI apparatus includes magnetic field distortion. Magnetic field distortion is allowed to some extent. However, if the magnetic field distortion is included in two three-dimensional images with different imaging timings, it is not possible to accurately determine the progress of the disease of the target part. In particular, in a case where the subject is an Alzheimer patient, the atrophy rate of the entire brain is 1% to 3% a year, while the atrophy rate of the entire brain of a normal person is less than 1% a year. For this reason, in follow-up of Alzheimer's disease, it is necessary to accurately recognize which portion of the brain is atrophied to what extent by comparing a three-dimensional image acquired at the time of previous diagnosis and the latest three-dimensional image. However, if magnetic field distortion is included in the three-dimensional image, it is not possible to distinguish whether the recognized atrophy of the brain is caused by the progress of the disease or by the magnetic field distortion.

In the present embodiment, a magnetic field distortion vector representing relative magnetic field distortion between the latest three-dimensional image and the past three-dimensional image is calculated, so that the amount of change in the volume of the brain, that is, the degree of atrophy of the brain, can be diagnosed using the magnetic field distortion vector without being affected by magnetic field distortion.

The image storage server 3 is a computer that stores and manages various kinds of data, and includes a large-capacity external storage device and software for database management. The image storage server 3 performs communication with other devices through the wired or wireless network 4 to transmit and receive image data or the like. Specifically, the image storage server 3 acquires image data, such as a three-dimensional image generated by the three-dimensional imaging apparatus 2, through the network, and stores the image data in a recording medium, such as a large-capacity external storage device, and manages the image data. The storage format of image data and the communication between devices through the network 4 is based on a protocol, such as a digital imaging and communication in medicine (DICOM). In the present embodiment, it is assumed that three-dimensional images of the head with different imaging timings for the same subject are stored in the image storage server 3.

The magnetic field distortion calculation device 1 is realized by installing a magnetic field distortion calculation program of the present invention in one computer. The computer may be a workstation or a personal computer that is directly operated by a doctor who performs diagnosis, or may be a server computer connected to these through a network. The magnetic field distortion calculation program is distributed by being recorded on a recording medium, such as a digital versatile disc (DVD) or a compact disk read only memory (CD-ROM), and is installed into the computer from the recording medium. Alternatively, the magnetic field distortion calculation program is stored in a storage device of a server computer connected to the network or in a network storage so as to be accessible from the outside, and is downloaded and installed into a computer used by a doctor when necessary.

Figure 2:
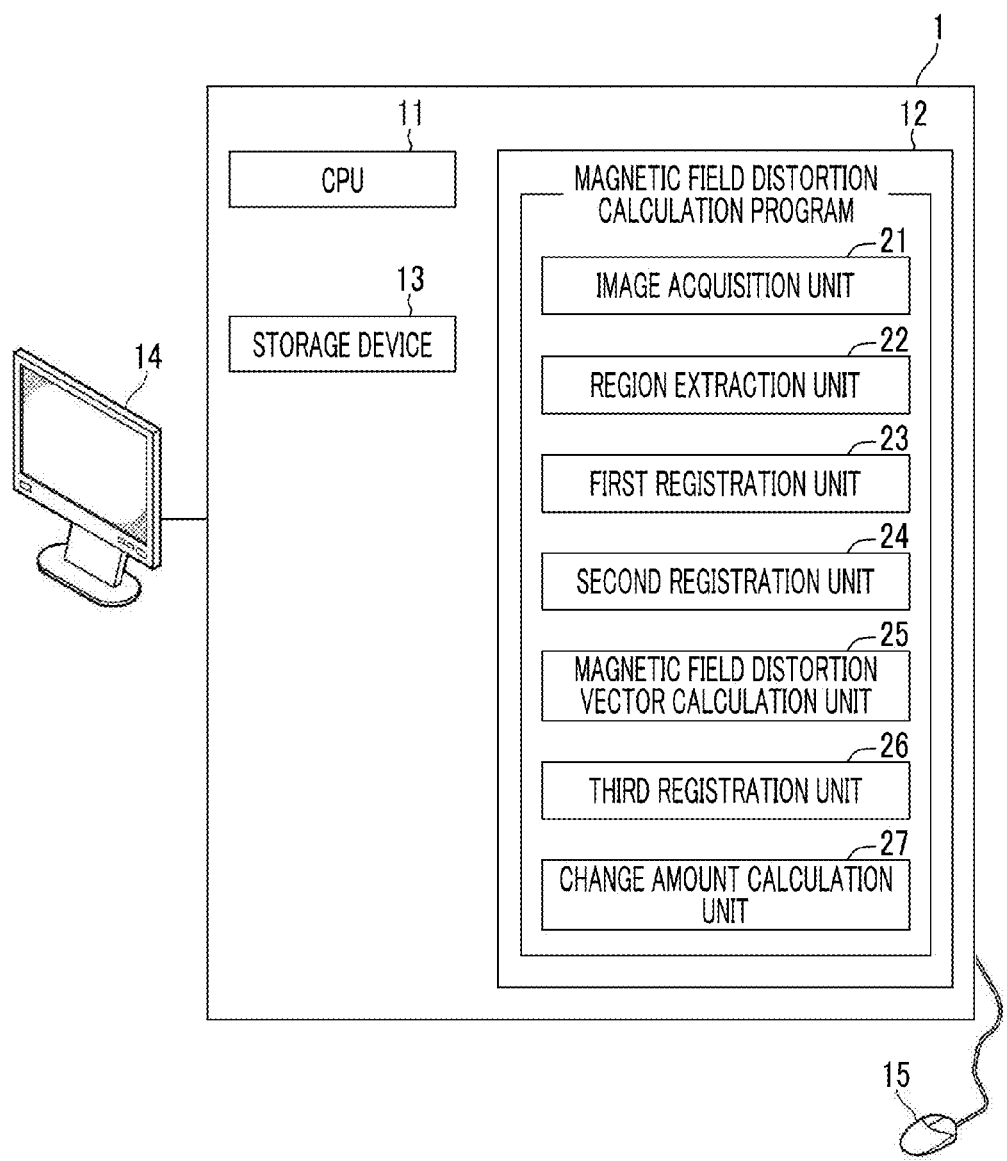
FIG. 2 is a schematic block diagram showing the configuration of the magnetic field distortion calculation device according to the present embodiment.

FIG. 2 is a diagram showing the schematic configuration of the magnetic field distortion calculation device realized by installing a magnetic field distortion calculation program in a computer. As shown in FIG. 2, the magnetic field distortion calculation device 1 includes a central processing unit (CPU) 11, a memory 12, and a storage device 13 as the configuration of a standard workstation. A display 14 and an input unit 15, such as a mouse, are connected to the magnetic field distortion calculation device 1.

Latest three-dimensional images and past three-dimensional images at the time of previous diagnosis for the same subject, which are acquired from the image storage server 3 through the network 4, and various kinds of information including information required for processing are stored in the storage device 13. In the present embodiment, it is assumed that a latest three-dimensional image G1 (first three-dimensional image), in which the head of the same subject is a target part, and a past three-dimensional image G2 (second three-dimensional image) acquired, for example, at the time of previous diagnosis are stored.

A magnetic field distortion calculation program is stored in the memory 12. A magnetic field distortion calculation program defines, as processing to be executed by the CPU 11: image acquisition processing for acquiring first and second three-dimensional images G1 and G2 that are acquired by the three-dimensional imaging apparatus 2; region extraction processing for extracting first and second shape-invariant regions corresponding to each other from the first and second three-dimensional images G1 and G2; first registration processing for acquiring a first deformation vector of each point on the first shape-invariant region with respect to each corresponding point on the second shape-invariant region by performing rigid registration between the first and second shape-invariant regions; second registration processing for acquiring a second deformation vector of each point on the first shape-invariant region of the first three-dimensional image G1 with respect to each corresponding point on the second shape-invariant region of the second three-dimensional image G2 by performing non-rigid registration between the first and second three-dimensional images G1 and G2 in the first and second shape-invariant regions; magnetic field distortion vector calculation processing for calculating a magnetic field distortion vector, which represents relative magnetic field distortion between the first and second three-dimensional images G1 and G2, at each point on the first three-dimensional image G1 based on the first and second deformation vectors; third registration processing for calculating a fourth deformation vector of each point of the brain, which is a target part included in the first three-dimensional image G1, with respect to each corresponding point of the brain included in the second three-dimensional image G2 by removing magnetic field distortion included in the first three-dimensional image G1 based on the magnetic field distortion vector and performing registration between the first three-dimensional image G11 from which the magnetic field distortion has been removed and the second three-dimensional image G2; and change amount calculation processing for calculating the amount of change in the volume of the brain based on the fourth deformation vector.

The CPU 11 executes these processes according to the program, so that the computer functions as an image acquisition unit 21, a region extraction unit 22, a first registration unit 23, a second registration unit 24, a magnetic field distortion vector calculation unit 25, a third registration unit 26, and a change amount calculation unit 27. The magnetic field distortion calculation device 1 may include a plurality of processors or processing circuits that perform image acquisition processing, region extraction processing, first registration processing, second registration processing, magnetic field distortion vector calculation processing, third registration processing, and change amount calculation processing.

The image acquisition unit 21 acquires the first and second three-dimensional images G1 and G2 of the head including the brain, which is a target part, from the image storage server 3. In a case where the first and second three-dimensional images G1 and G2 are already stored in the storage device 13, the image acquisition unit 21 may acquire the first and second three-dimensional images G1 and G2 from the storage device 13.

Figure 3:
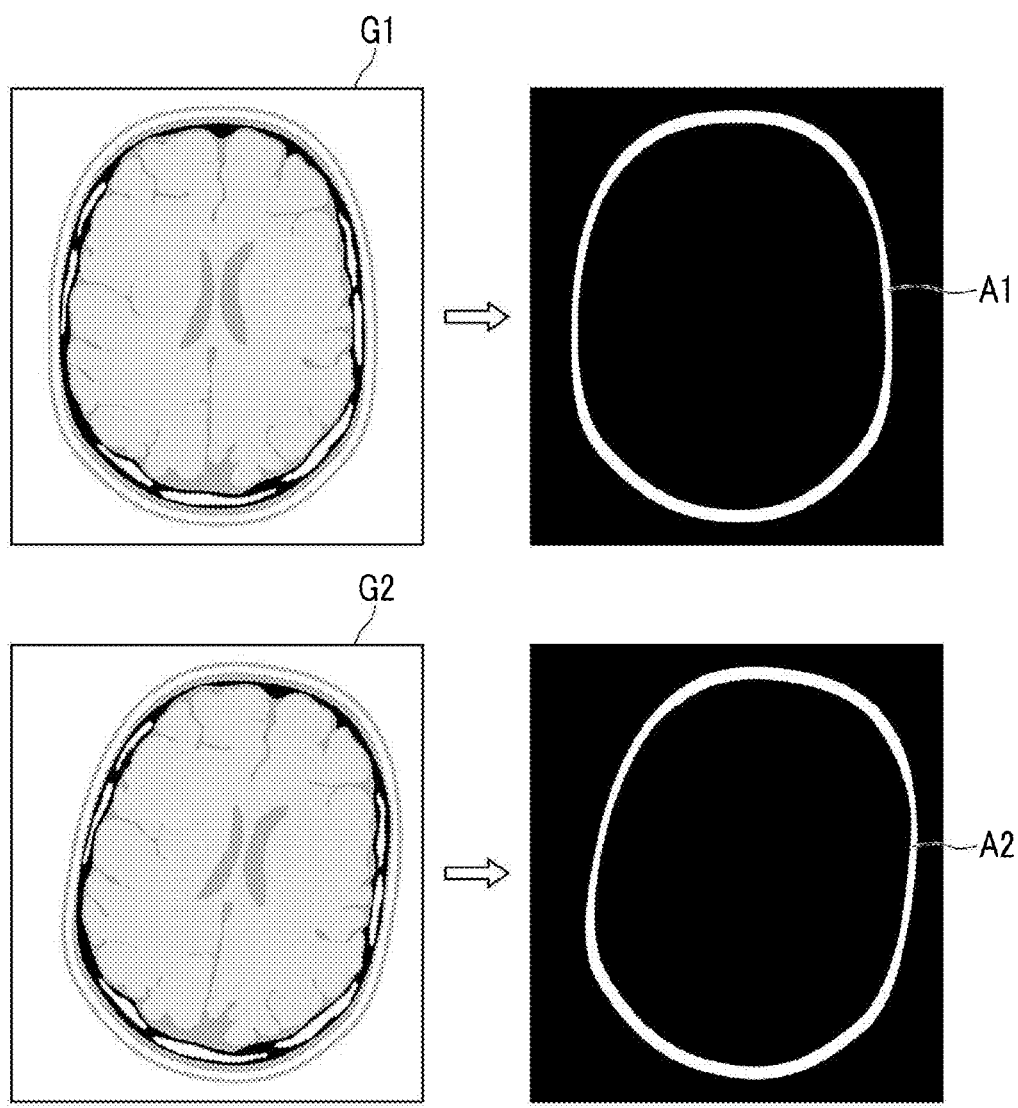
FIG. 3 is a diagram illustrating the extraction of a shape-invariant region.

The region extraction unit 22 extracts first and second shape-invariant regions corresponding to each other from the first and second three-dimensional images G1 and G2. In the present embodiment, the region extraction unit 22 extracts a region of the skull from the first and second three-dimensional images G1 and G2 as first and second shape-invariant regions A1 and A2. Here, the skull is included as a relatively high-brightness region in the first and second three-dimensional images G1 and G2. The region extraction unit 22 extracts regions having relatively high-brightness pixel values (voxel values), which can be regarded as bones in the first and second three-dimensional images G1 and G2, as the first and second shape-invariant regions A1 and A2, by threshold processing. FIG. 3 is a diagram illustrating the extraction of the first and second shape-invariant regions A1 and A2 from the first and second three-dimensional images G1 and G2. As shown in FIG. 3, the region extraction unit 22 extracts only the skull, as the first shape-invariant region A1, from the tissue of the head included in the first three-dimensional image G1. Similarly for the second three-dimensional image G2, the region extraction unit 22 extracts the second shape-invariant region A2. The method of extracting the first and second shape-invariant regions A1 and A2 is not limited to this, and it is possible to use an arbitrary method, such as a method using a discriminator that performs learning so as to extract a bone region from a three-dimensional image acquired by the MRI apparatus. In addition, it is assumed that the skull does not include the mandible with movement.

The first registration unit 23 performs first registration processing for acquiring a first deformation vector V1 of each point on the first shape-invariant region A1 with respect to each corresponding point on the second shape-invariant region A2 by performing rigid registration between the first and second shape-invariant regions A1 and A2. Specifically, the first registration unit 23 calculates a parallel movement component and a rotation component between corresponding points of the first and second shape-invariant regions A1 and A2 so that the sum of squares of the distances between respective points on the first shape-invariant region A1 and respective points on the second shape-invariant region A2 corresponding thereto is minimized. The respective points may be all pixel positions in the first and second shape-invariant regions A1 and A2, or may be pixel positions thinned out appropriately. In addition, the calculation of the parallel movement component and the rotation component is not limited to the least squares method, and any method can be used.

Figure 4:
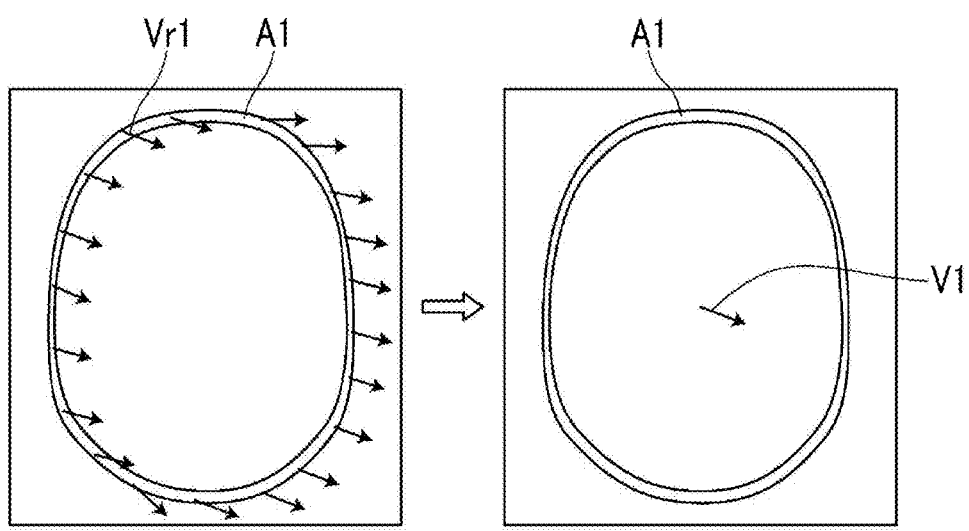
FIG. 4 is a diagram illustrating the acquisition of a first deformation vector.

FIG. 4 is a diagram illustrating the acquisition of the first deformation vector V1. As shown in FIG. 4, the first registration unit 23 calculates a parallel movement component and a rotation component as a deformation vector Vr1 at each point on the first shape-invariant region A1. In FIG. 4, for the sake of explanation, the deformation vector Vr1 acquired at a position thinned out appropriately on the first shape-invariant region A1 is shown. In FIG. 4 and subsequent explanation, the acquisition of the deformation vector is shown in a two-dimensional image. In practice, however, a three-dimensional deformation vector is acquired in a three-dimensional image.

Then, as shown in FIG. 4, the first registration unit 23 calculates an average value of the deformation vector Vr1 showing the parallel movement component and the rotation component of each pixel, thereby acquiring the first deformation vector V1. As a result, the first deformation vector V1 represents a positional deviation due to parallel movement and rotation of the first shape-invariant region A1 with respect to the second shape-invariant region A2.

Figure 5:
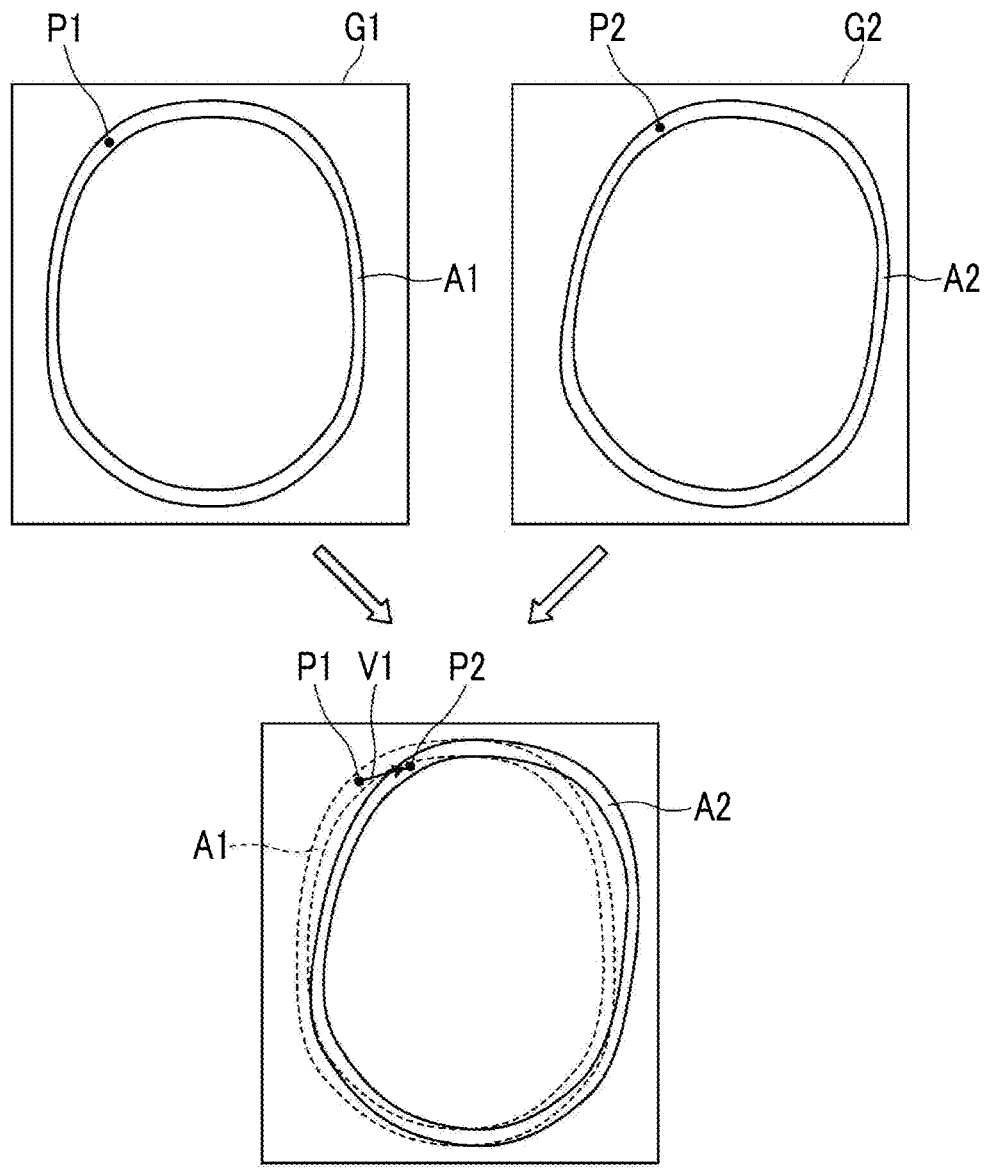
FIG. 5 is a diagram showing the relationship between corresponding pixel positions P1 and P2 on first and second shape-invariant regions A1 and A2 and a first deformation vector V1.

FIG. 5 is a diagram showing the relationship between corresponding pixel positions P1 and P2 on the first and second shape-invariant regions A1 and A2 and the first deformation vector V1. As shown in FIG. 5, coordinate transformation from the pixel position P1 in the first shape-invariant region A1 to the pixel position P2 in the second shape-invariant region A2 is expressed by the following Equation (1) using the first deformation vector V1. In the lower part of FIG. 5, the first shape-invariant region A1 is indicated by a broken line, and the second shape-invariant region A2 is indicated by a solid line.

$$P2=P1+V1 \qquad (1)$$

The second registration unit 24 performs second registration for acquiring a second deformation vector V2 of each point on the first shape-invariant region A1 of the first three-dimensional image G1 with respect to each corresponding point on the second shape-invariant region A2 of the second three-dimensional image G2 by performing non-rigid registration between the first and second three-dimensional images G1 and G2 in the first and second shape-invariant regions A1 and A2. In the present embodiment, the second deformation vector V2 is acquired by performing non-rigid registration between the first and second shape-invariant regions A1 and A2. Non-rigid registration between a region in the first shape-invariant region A1 including the first shape-invariant region A1 of the first three-dimensional image G1 and a region in the second shape-invariant region A2 including the second shape-invariant region A2 of the second three-dimensional image G2 may be performed, and only a deformation vector present in the first and second shape-invariant regions A1 and A2, among deformation vectors acquired by the non-rigid registration, may be acquired as a second deformation vector.

In the present embodiment, the non-rigid registration is a method of calculating and acquiring the amount of deformation of each point of the first shape-invariant region A1, which is for matching the first and second shape-invariant regions A1 and A2 with each other, as the second deformation vector V2 by moving each point on the first shape-invariant region A1 based on the amount of deformation of each point to maximize or minimize a predetermined function for determining the similarity between the first and second shape-invariant regions A1 and A2. As examples of the non-rigid registration, it is possible to apply various known methods, such as "Rueckert D Sonoda L I, Hayesc, Et al., "Nonrigid Registration Using Free-Form Deformations: application to breast MR Images", IEEE transactions on Medical Imaging, 1999, vol. 18, No. 8, pp. 712-721".

Figure 6:
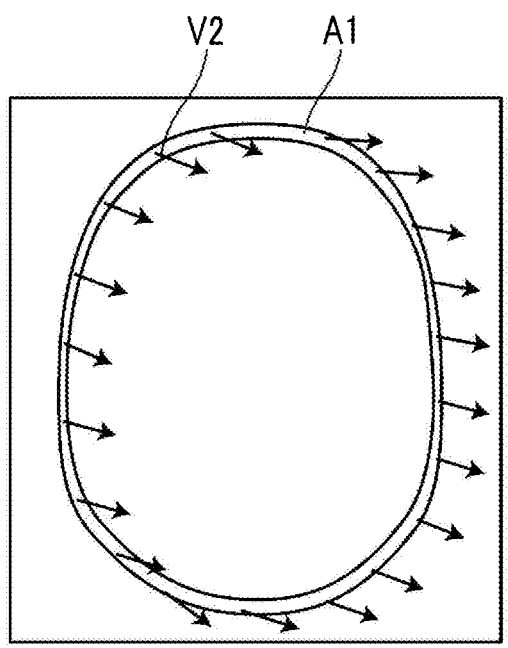
FIG. 6 is a diagram illustrating the acquisition of a second deformation vector.

FIG. 6 is a diagram illustrating the acquisition of the second deformation vector V2. As shown in FIG. 6, the second registration unit 24 acquires the second deformation vector V2 at each point on the first shape-invariant region A1. In FIG. 6, for the sake of explanation, the second deformation vector V2 acquired at a position thinned out appropriately on the first shape-invariant region A1 is shown.

Figure 7:
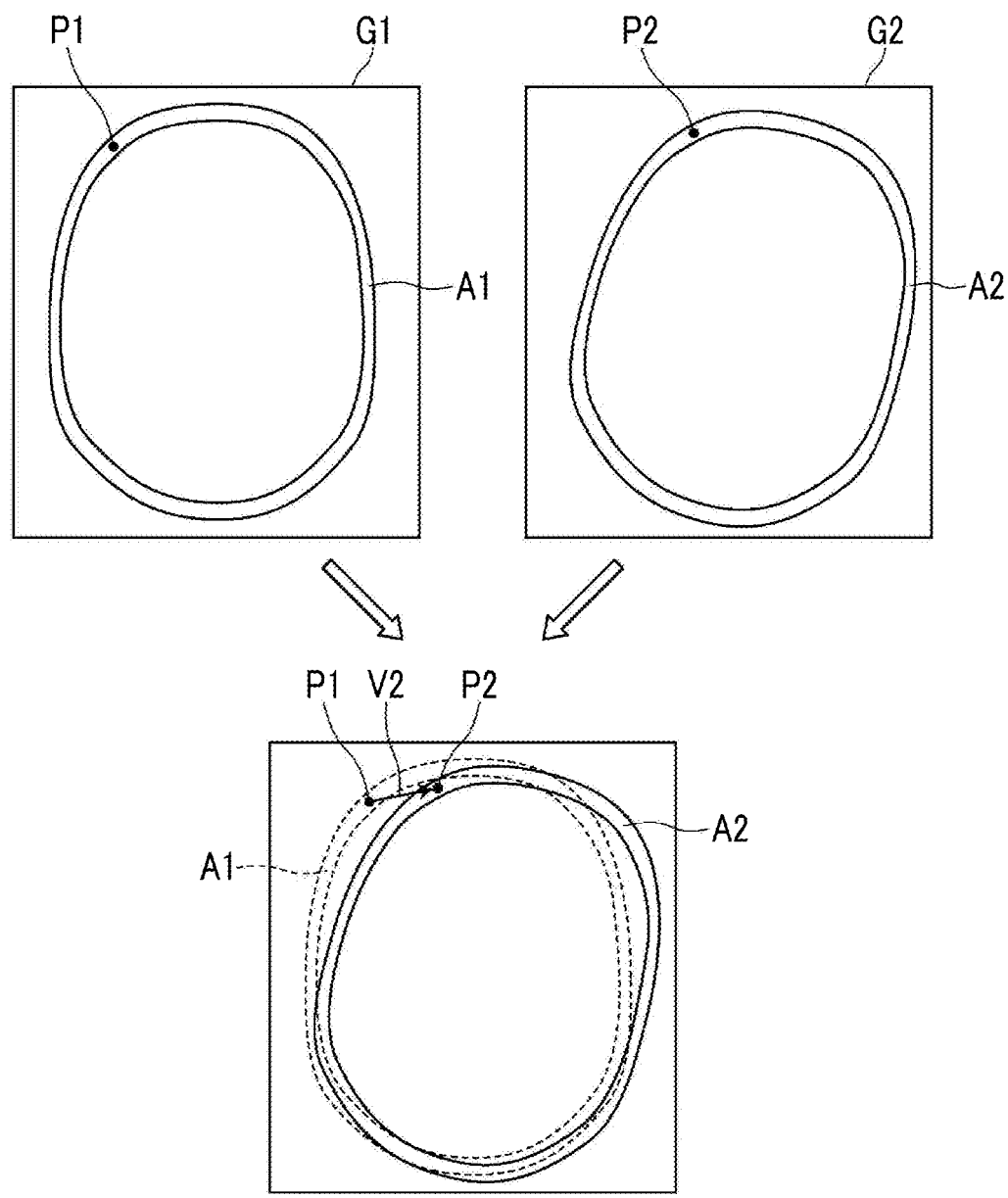
FIG. 7 is a diagram showing the relationship between the corresponding pixel positions P1 and P2 on the first and second shape-invariant regions A1 and A2 and a second deformation vector V2.

FIG. 7 is a diagram showing the relationship between the corresponding pixel positions P1 and P2 on the first and second shape-invariant regions A1 and A2 and the second deformation vector V2. As shown in FIG. 7, the coordinate transformation from the pixel position P1 in the first shape-invariant region A1 to the pixel position P2 in the second shape-invariant region A2 is expressed by the following Equation (2) using the second deformation vector V2. Also in the lower part of FIG. 7, the first shape-invariant region A1 is indicated by a broken line, and the second shape-invariant region A2 is indicated by a solid line.

$$P2=P1+V2 \qquad (2)$$

Figure 8:
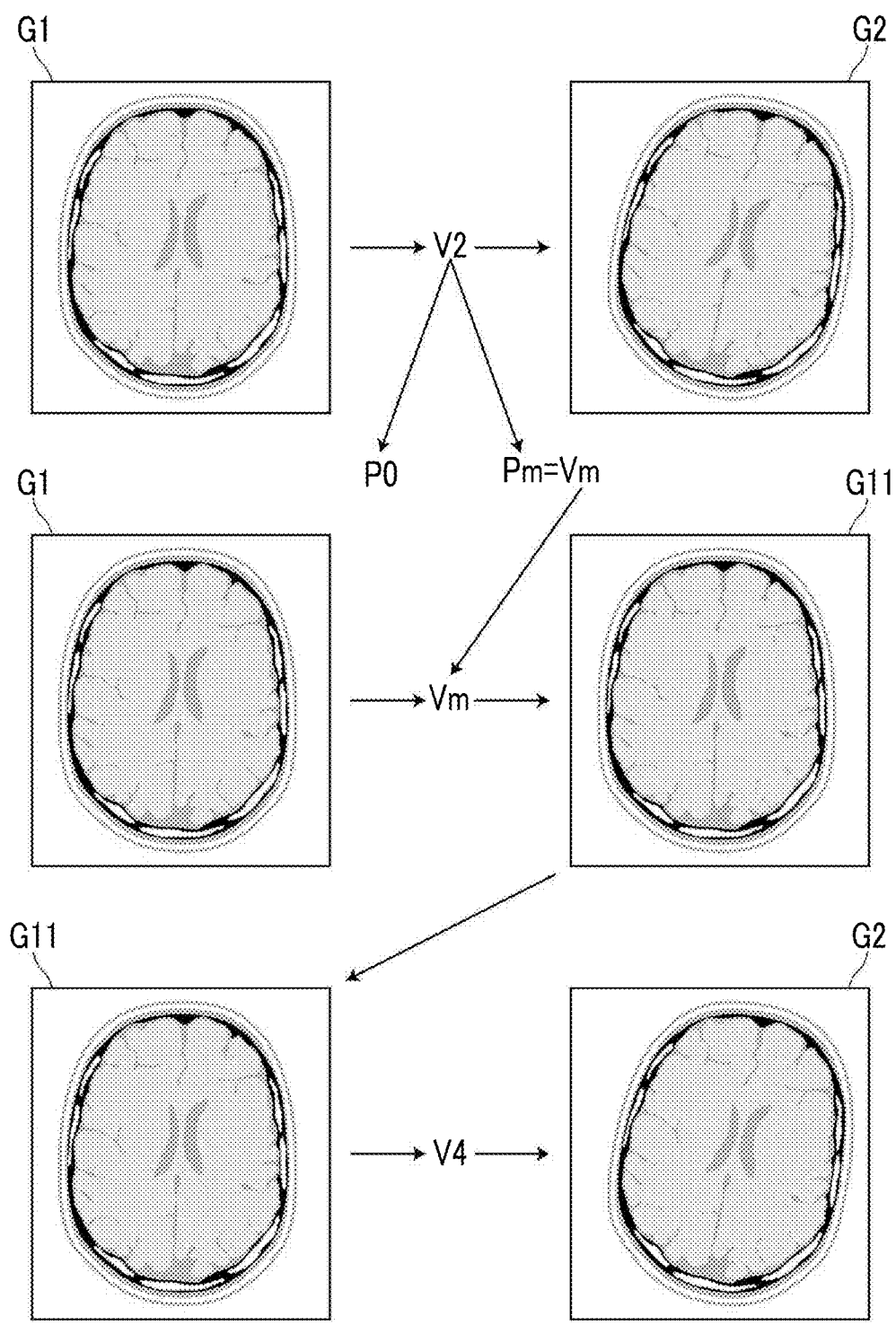
FIG. 8 is a diagram illustrating the relationship between first and second three-dimensional images and the second deformation vector.

FIG. 8 is a diagram illustrating the relationship between the first and second three-dimensional images G1 and G2 and the second deformation vector V2. When the first shape-invariant region A1 of the first three-dimensional image G1 is deformed by the second deformation vector V2, the second shape-invariant region A2 of the second three-dimensional image G2 is obtained.

On the other hand, in the present embodiment, the first and second three-dimensional images G1 and G2 are acquired by the MRI apparatus. Accordingly, a region of the skull of the subject included in each of the three-dimensional images G1 and G2 is distorted from the actual skull due to the influence of magnetic field distortion. In the first and second three-dimensional images G1 and G2, the degree of magnetic field distortion differs due to a difference in imaging timing. Accordingly, the degree of deformation of the skull is different. The disease of an Alzheimer patient progresses and the brain is atrophied. Accordingly, in the first and second three-dimensional images G1 and G2, the brain is deformed due to atrophy of the brain due to a difference in imaging timing. In order to calculate deformation due to atrophy of the brain and accurately diagnose the Alzheimer's disease, it is necessary to perform registration between the first and second three-dimensional images G1 and G2 after removing the relative magnetic field distortion between the first and second three-dimensional images G1 and G2 at each point on the first three-dimensional image G1.

Here, the first and second shape-invariant regions A1 and A2 are the skull excluding the mandible. Since Alzheimer's test is performed for elderly patients in many cases, the skull hardly grows and deforms with the passage of time. For this reason, the second deformation vector V2 calculated from the first and second shape-invariant regions A1 and A2 does not include deformation of the skull itself, but includes a positional deviation P0 due to parallel movement and rotation of the first shape-invariant region A1 with respect to the second shape-invariant region A2 and deformation Pm due to relative magnetic field distortion between the first and second three-dimensional images G1 and G2.

The magnetic field distortion vector calculation unit 25 calculates a magnetic field distortion vector Vm, which represents relative magnetic field distortion between the first and second three-dimensional images G1 and G2, at each point on the first three-dimensional image G1 based on the first and second deformation vectors V1 and V2. Specifically, by correcting the second deformation vector V2 in the first shape-invariant region A1 based on the first deformation vector V1, a third deformation vector V3 is calculated as the magnetic field distortion vector Vm in the first shape-invariant region A1. Here, the first deformation vector V1 represents a positional deviation due to parallel movement and rotation of the first shape-invariant region A1 with respect to the second shape-invariant region A2. Therefore, the third deformation vector V3 may be calculated by subtracting the first deformation vector V1 from the second deformation vector V2.

Figure 9:
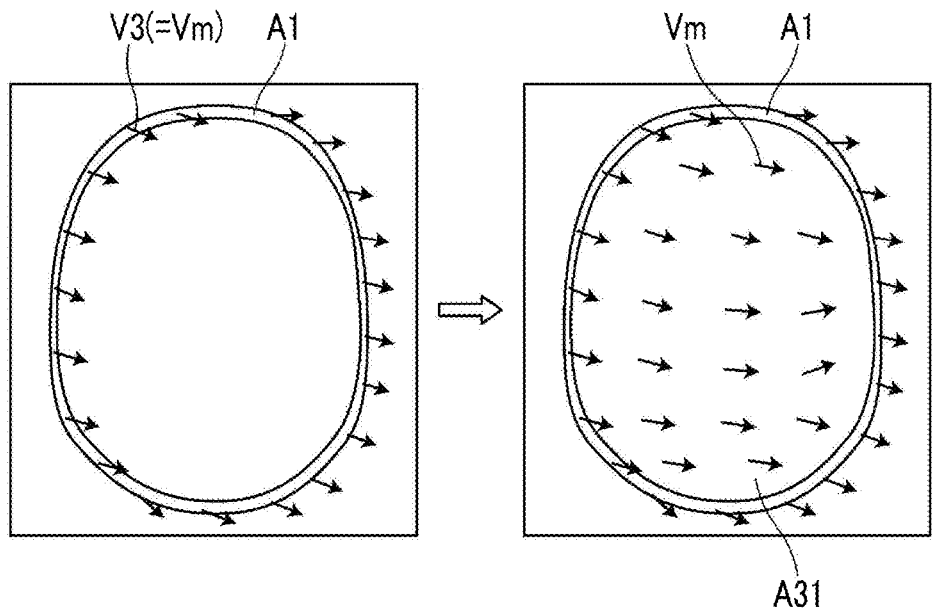
FIG. 9 is a diagram illustrating the acquisition of a third deformation vector.

FIG. 9 is a diagram illustrating the acquisition of the third deformation vector V3. As shown in FIG. 9, the first registration unit 23 calculates the third deformation vector V3 as the magnetic field distortion vector Vm at each point on the first shape-invariant region A1. In addition, the magnetic field distortion vector calculation unit 25 calculates the magnetic field distortion vector Vm in another region A3 other than the first shape-invariant region A1 in the first three-dimensional image G1 based on the third deformation vector V3. Specifically, the magnetic field distortion vector Vm in another region A3 is calculated by spatially interpolating the third deformation vector V3 on the first shape-invariant region A1 by performing function fitting to a known model, such as an affine transformation model or a thin plate spline model. The method of calculating the magnetic field distortion vector Vm in another region A3 is not limited to these, and any interpolation method can be used. Therefore, as shown in FIG. 9, the magnetic field distortion vector Vm in the first shape-invariant region A1 and another region A3 is calculated. In addition, the magnetic field distortion vector Vm calculated as described above matches the deformation Pm due to relative magnetic field distortion between the first and second three-dimensional images G1 and G2 in FIG. 8.

The third registration unit 26 removes the magnetic field distortion included in the first three-dimensional image G1 based on the magnetic field distortion vector Vm. Specifically, as shown in FIG. 8, by deforming the first three-dimensional image G1 based on the magnetic field distortion vector Vm, a first three-dimensional image G11 from which the magnetic field distortion has been removed is generated. Then, the third registration unit 26 performs third registration processing for calculating a fourth deformation vector V4 of each point of the brain, which is a target part included in the first three-dimensional image G11, with respect to each corresponding point of the brain included in the second three-dimensional image G2 by performing non-rigid registration between the first three-dimensional image G11 from which the magnetic field distortion has been removed and the second three-dimensional image G2. The non-rigid registration may be performed in the same manner as the second registration unit 24. The removal of the magnetic field distortion and the calculation of the fourth deformation vector V4 may be performed only for the skull in the first three-dimensional image G11 and a region inside the skull. However, the removal of the magnetic field distortion and the calculation of the fourth deformation vector V4 may also be performed in the entire first three-dimensional image G11. Here, the fourth deformation vector V4 represents only deformation due to atrophy of the brain due to a difference in imaging timing between the first and second three-dimensional images G1 and G2. Accordingly, as shown in FIG. 8, by deforming the first three-dimensional image G11 from which the magnetic field distortion has been removed using the fourth deformation vector V4, the second three-dimensional image G2 is obtained.

The first shape-invariant region A1 in the first three-dimensional image G11 from which the magnetic field distortion has been removed and the second shape-invariant region A2 in the second three-dimensional image G2 can be made to match each other by the parallel movement component and the rotation component represented by the rigid registration.

Figure 10:
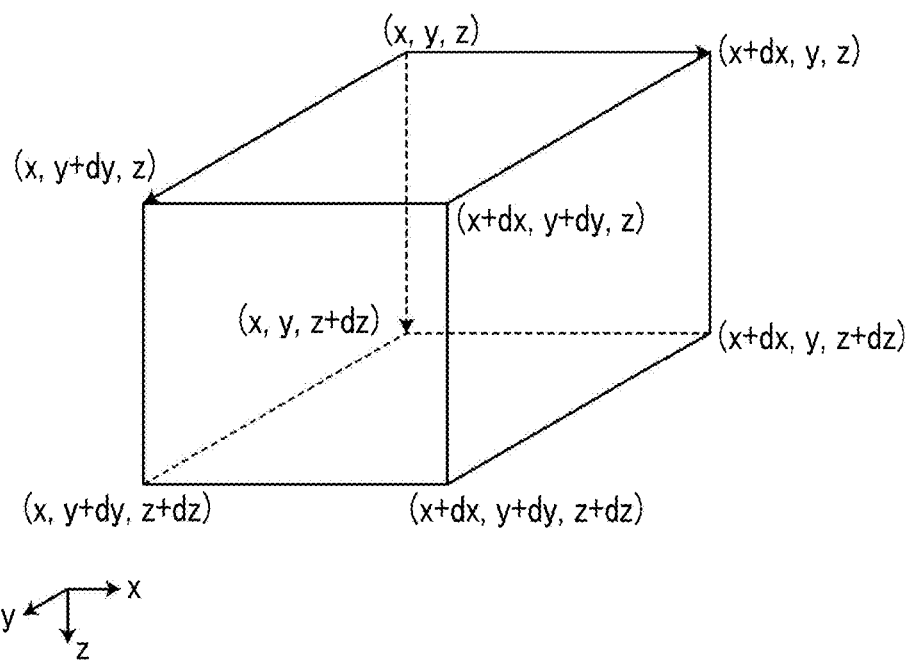
FIG. 10 is a diagram illustrating the calculation of the amount of change in the volume of the brain.
Figure 11:
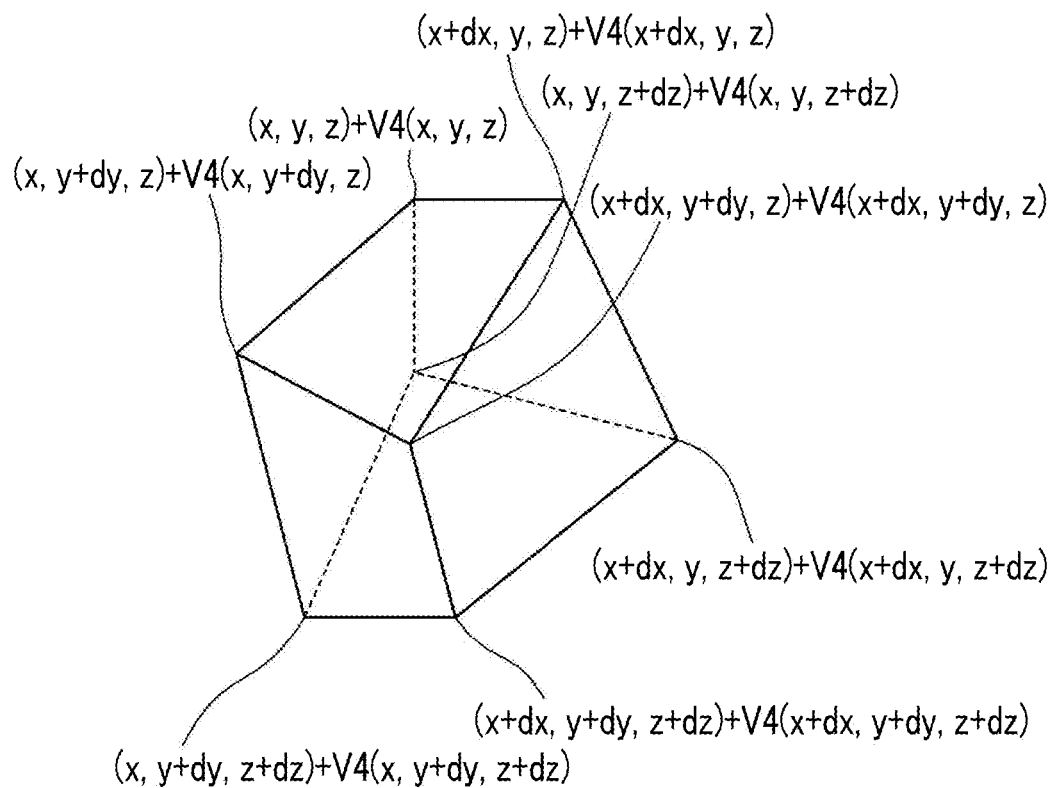
FIG. 11 is a diagram illustrating the calculation of the amount of change in the volume of the brain.

The change amount calculation unit 27 calculates the amount of change in the volume of the brain based on the fourth deformation vector V4. Hereinafter, the calculation of the amount of change in the volume of the brain will be described. First, the change amount calculation unit 27 extracts a brain region from the first three-dimensional image G1. Then, at each pixel position in the brain region, a volume change amount is calculated. FIGS. 10 and 11 are diagrams illustrating the calculation of the amount of change in the volume of the brain. The fourth deformation vector V4 at a certain pixel position (x, y, z) in the brain region is set to V4(x, y, z). First, a hexahedron having eight points of (x, y, z), (x+dx, y, z) (x, y+dy, z), (x, y, z+dz), (x+dx, y+dy, z), (x+dx, y, z+dz), (x, y+dy, z+dz), and (x+dx, y+dy, z+dz), which are obtained by displacing a pixel position (x, y, z) in directions of x, y, and z axes, as its apices is considered. The hexahedron is a rectangular parallelepiped, and its volume VOL1 is calculated by dx×dy×dz.

On the other hand, when the above eight points are deformed by the fourth deformation vector V4, {(x, y, z)+V4(x, y, z)}, {(x+dx, y, z)+V4(x+dx, y, z)}, {(x, y+dy, z)+V4(x, y+dy, z)}, {(x, y, z+dz)+V4(x, y, z+dz)}, {(x+dx, y+dy, z)+V4(x+dx, y+dy, z)}, {(x+dx, y, z+dz)+V4(x+dx, y, z+dz)}, {(x, y+dy, z+dz)+V4(x, y+dy, z+dz)}, and {(x+dz, y+dy, z+dz)+V4(x+dz, y+dy, z+dz)} are obtained. Accordingly, the rectangular parallelepiped shown in FIG. 10 is deformed as shown in FIG. 11, for example. The change amount calculation unit 27 calculates the volume VOL2 of the deformed hexahedron. Specifically, the change amount calculation unit 27 calculates an average value of the coordinate values of the eight pixel positions. The pixel position having the average value is a point inside deformed hexahedron. Then, a total value of the volumes of six quadrangular pyramids, each of which has the pixel position having the average value as its apex, is calculated as the volume VOL2 of the deformed hexahedron.

Then, the change amount calculation unit 27 calculates a volume change amount at each pixel position. The volume change amount is calculated by VOL2/VOL1−1. If there is no change in the volume, the volume change amount is VOL2/VOL1=1. On the other hand, if the volume is reduced, VOL2/VOL1 is a value smaller than 1. Accordingly, the volume change amount is a negative value. If the volume is increased, VOL2/VOL1 is a value larger than 1. Accordingly, the volume change amount is a positive value. The change amount calculation unit 27 visualizes the volume change amount of each pixel position in the brain, as a brain atrophy rate, in the brain image generated from the first three-dimensional image G1, and displays it on the display 14. Hereinafter, visualization of the volume change amount will be described.

Figure 12:
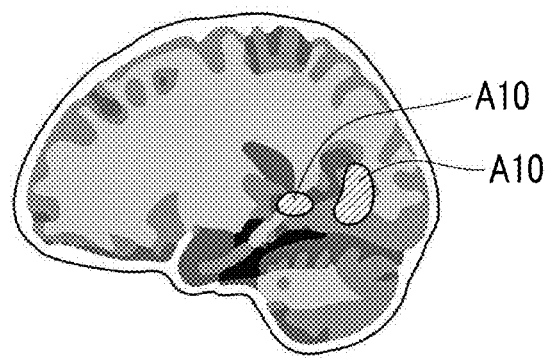
FIG. 12 is a diagram showing a state in which a volume change amount is visualized in a brain image showing the surface of the brain.

FIG. 12 is a diagram showing a state in which a volume change amount is visualized in an image showing the surface of the brain generated from the first three-dimensional image G1. FIG. 12 is a brain image of the left side surface of the brain. As shown in FIG. 12, in the brain image, a region (hereinafter, referred to as an abnormal region) A10 including a pixel position where the volume change amount exceeds ±3%, that is, a pixel position where the absolute value of the volume change amount exceeds 3%, is shown with a color different from the surface of the brain, for example, red. In FIG. 12, the color is indicated by diagonal lines. Although FIG. 12 shows an image of the left side surface of the brain, the abnormal region A10 may be visualized by displaying an image of one of the left side surface, the right side surface, the rear surface, the front surface, the top surface, and the bottom surface or a plurality of images of a plurality of surfaces among these.

Figure 13:
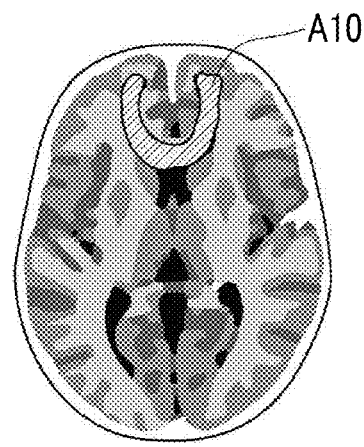
FIG. 13 is a diagram showing a state in which a volume change amount is visualized in a brain image showing the cross section of the brain.

FIG. 13 is a diagram showing a state in which a volume change amount is visualized in a brain image showing a cross section of the brain generated from the first three-dimensional image G1. As shown in FIG. 13, in the brain image of the axial cross section of the brain, an abnormal region A10 including a pixel position where the absolute value of the volume change amount exceeds 3% is shown with a color different from its surrounding, for example, red. In FIG. 13, the color is indicated by diagonal lines. The position of the displayed cross section can be changed by the operation of the operator. Although FIG. 13 shows an image of the axial cross section of the brain, the abnormal region A10 may be visualized by displaying an image of one of the axial cross section, the coronal cross section, and the sagittal section or images of a plurality of cross sections among these.

In FIGS. 12 and 13, the abnormal region A10 where the absolute value of the volume change amount exceeds 3% is visualized with one color. However, the abnormal region may be visualized with stepwise different colors according to the volume change amount. In this case, for example, the volume change amount may be visualized by using red for a region where the absolute value of the volume change amount exceeds 3%, orange for a region where the absolute value of the volume change amount is 2% or more and less than 3%, yellow for a region where the absolute value of the volume change amount is 1% or more and less than 2%, and green for a region where the absolute value of the volume change amount is less than 1%. In addition, each pixel position may be visualized with stepwise different colors according to the volume change amount. In the brain image showing the cross section of the brain, each pixel position may be visualized with stepwise different colors according to the volume change amount. In addition, a motion picture may be generated so that the cross section position is sequentially changed. Thus, the volume change amount at each position of the brain can be checked on the motion picture.

Figure 14:
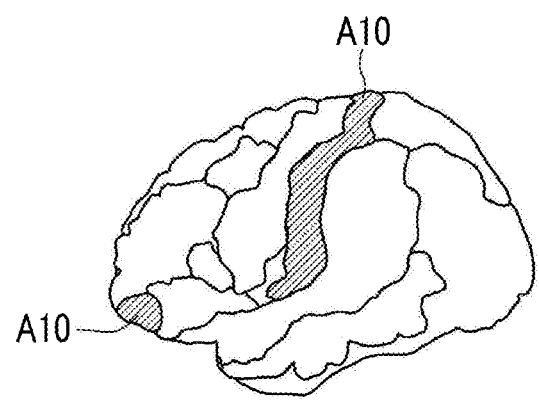
FIG. 14 is a diagram showing a state in which an abnormal region is visualized for each brain area in a brain image showing the surface of the brain.

On the other hand, in the brain, the cerebral neocortex can be anatomically divided into a plurality of brain areas. Therefore, the extracted brain may be divided into a plurality of brain areas, and the volume change amount may be calculated for each brain area. In this case, a representative value such as an average value, a maximum value, and a standard deviation of the volume change amount of each pixel position calculated in each brain area may be calculated, and a brain area where the absolute value of the representative value exceeds 3% may be visualized as the abnormal region A10 in the first three-dimensional image G1. FIG. 14 is a diagram showing a state in which the volume change amount is visualized for each brain area in a brain image showing a surface of the brain. In FIG. 14, the image showing the surface of the brain is divided into brain areas. However, a brain image showing a cross section of the brain may be divided into brain areas, and an abnormal region may be visualized for each brain area.

Next, a process performed in the present embodiment will be described. FIG. 15 is a flowchart showing the process performed in the present embodiment. First, the image acquisition unit 21 acquires the first and second three-dimensional images G1 and G2 (step ST1). The region extraction unit 22 extracts the first and second shape-invariant regions A1 and A2 corresponding to each other from the first and second three-dimensional images G1 and G2 (step ST2). Then, the first registration unit 23 performs first registration processing for acquiring the first deformation vector V1 of each point on the first shape-invariant region A1 with respect to each corresponding point on the second shape-invariant region A2 by performing rigid registration between the first and second shape-invariant regions A1 and A2 (step ST3).

Then, the second registration unit 24 performs second registration processing for acquiring the second deformation vector V2 by performing non-rigid registration between the first and second three-dimensional images G1 and G2 in the first and second shape-invariant regions A1 and A2 (step ST4). Then, the magnetic field distortion vector calculation unit 25 calculates the magnetic field distortion vector Vm, which represents relative magnetic field distortion between the first and second three-dimensional images G1 and G2, at each point on the first three-dimensional image G1 based on the first and second deformation vectors V1 and V2 (step ST5). Then, the third registration unit 26 removes magnetic field distortion included in the first three-dimensional image G1 based on the magnetic field distortion vector Vm, thereby generating the first three-dimensional image G11 from which the magnetic field distortion has been removed (step ST6). Then, the third registration unit 26 performs third registration processing for calculating the fourth deformation vector V4 of each point of the brain, which is a target part included in the first three-dimensional image G11, with respect to each corresponding point of the brain included in the second three-dimensional image G2 by performing non-rigid registration between the first three-dimensional image G11 from which the magnetic field distortion has been removed and the second three-dimensional image G2 (step ST7). Then, the change amount calculation unit 27 calculates the amount of change in the volume of the brain based on the fourth deformation vector V4 (step ST8), and visualizes the calculated amount of change in the volume of the brain on the brain image obtained from the first three-dimensional image G1 and displays it on the display 14 (step ST9), and ends the process.

Thus, in the present embodiment, the magnetic field distortion vector Vm, which represents relative magnetic field distortion between the first and second three-dimensional images G1 and G2, at each point on the first three-dimensional image G1 is calculated based on the first and second deformation vectors V1 and V2. Therefore, it is possible to calculate the relative magnetic field distortion vector Vm between the first and second three-dimensional images G1 and G2 without performing a calibration for periodically measuring the magnetic field distortion using a phantom or the like.

In addition, by calculating the fourth deformation vector V4 by removing magnetic field distortion included in the first three-dimensional image G1 based on the magnetic field distortion vector Vm and performing non-rigid registration between the first three-dimensional image G11 from which the magnetic field distortion has been removed and the second three-dimensional image G2, only deformation at each position of the brain, which is a target part, between the first and second three-dimensional images G1 and G2 can be calculated as the fourth deformation vector V4 since the influence due to the magnetic field distortion is eliminated. Accordingly, temporal deformation at each position of the brain between the first and second three-dimensional images G1 and G2 can be accurately calculated without being affected by magnetic field distortion.

In addition, by calculating the amount of change in the volume of the brain based on the fourth deformation vector V4, it is possible to accurately calculate the atrophy rate at each position of the brain necessary for diagnosis of Alzheimer's disease.

In the embodiment described above, the change amount calculation unit 27 calculates the amount of change in the volume of the brain based on the fourth deformation vector V4. However, without calculating the fourth deformation vector V4, the volume of the brain in the first three-dimensional image G11 after removing the magnetic field distortion and the volume of the brain in the second three-dimensional image G2 may be calculated from the number of voxels of each image, and the difference between the volumes may be calculated as the volume change amount.

In the embodiment described above, the latest three-dimensional image is registered with respect to the past three-dimensional image. However, the first three-dimensional image G1 may be used as the past three-dimensional image and the second three-dimensional image G2 may be used as the latest three-dimensional image, and the past three-dimensional image may be registered with respect to the latest three-dimensional image.

Hereinafter, the effect of the present embodiment will be described.

By calculating the fourth deformation vector of each point of a target part, which is included in the first three-dimensional image, with respect to each corresponding point of the target part included in the second three-dimensional image by removing magnetic field distortion included in the first three-dimensional image based on the magnetic field distortion vector and performing non-rigid registration between the first three-dimensional image from which the magnetic field distortion has been removed and the second three-dimensional image, only deformation of the target part between the first and second three-dimensional images can be calculated as the fourth deformation vector since the influence due to the magnetic field distortion is eliminated. Accordingly, temporal deformation of the target part between the first and second three-dimensional images can be accurately calculated without being affected by magnetic field distortion.

By calculating the amount of change in the volume of the target part based on the fourth deformation vector, it is possible to accurately calculate the amount of change in the volume of the target part.

By setting the brain as a target part, temporal deformation at each position of the brain between the first and second three-dimensional images can be calculated. Therefore, it is possible to accurately calculate the atrophy rate of the brain necessary for diagnosis of Alzheimer's disease.

Since the skull stops growing after 50 years old, deformation of the skull with time hardly occurs. For this reason, by setting the skull as a shape-invariant region in the case of calculating the atrophy rate of the brain of an elderly person suffering from Alzheimer's disease, the atrophy rate of the brain can be accurately calculated without being affected by deformation of a shape-invariant region with time.

What is claimed is:

1. A magnetic field distortion calculation device, comprising:
    a processor configured for
        acquiring first and second three-dimensional images with different imaging timings that are acquired by imaging a target part of a subject performing with an MRI apparatus;
        extracting first and second shape-invariant regions corresponding to each other from the first and second three-dimensional images;
        acquiring a first deformation vector of each point on the first shape-invariant region with respect to each corresponding point on the second shape-invariant region by performing rigid registration between the first and second shape-invariant regions;
        acquiring a second deformation vector of each point on the first shape-invariant region of the first three-dimensional image with respect to each corresponding point on the second shape-invariant region of the second three-dimensional image by performing non-rigid registration between the first and second three-dimensional images in the first and second shape-invariant regions;
        calculating a fourth deformation vector of each point of the target part, which is included in the first three-dimensional image, with respect to each corresponding point of the target part included in the second three-dimensional image by removing magnetic field distortion included in the first three-dimensional image based on the magnetic field distortion vector and performing non-rigid registration between the first three-dimensional image from which the magnetic field distortion has been removed and the second three-dimensional image; and
        calculating a magnetic field distortion vector, which represents relative magnetic field distortion between the first and second three-dimensional images, at each point on the first three-dimensional image based on the first and second deformation vectors.

2. The magnetic field distortion calculation device according to claim 1, further comprising:
    calculating a third deformation vector, which is acquired by correcting the second deformation vector in the first shape-invariant region based on the first deformation vector, as the magnetic field distortion vector in the first shape-invariant region, and calculating the magnetic field distortion vector based on the third deformation vector in a region other than the first shape-invariant region in the first three-dimensional image.

3. The magnetic field distortion calculation device according to claim 1, further comprising:
    calculating an amount of change in volume of the target part based on the fourth deformation vector.

4. The magnetic field distortion calculation device according to claim 1,
    wherein the target part is a brain.

5. The magnetic field distortion calculation device according to claim 4,
    wherein the first and second shape-invariant regions are a skull.

6. A magnetic field distortion calculation method, comprising:
    acquiring first and second three-dimensional images with different imaging timings that are acquired by imaging a target part of a subject performing with an MRI apparatus;
    extracting first and second shape-invariant regions corresponding to each other from the first and second three-dimensional images;
    acquiring a first deformation vector of each point on the first shape-invariant region with respect to each corresponding point on the second shape-invariant region by performing rigid registration between the first and second shape-invariant regions;

acquiring a second deformation vector of each point on the first shape-invariant region of the first three-dimensional image with respect to each corresponding point on the second shape-invariant region of the second three-dimensional image by performing non-rigid registration between the first and second three-dimensional images in the first and second shape-invariant regions;

calculating a magnetic field distortion vector, which represents relative magnetic field distortion between the first and second three-dimensional images, at each point on the first three-dimensional image based on the first and second deformation vectors; and calculating a fourth deformation vector of each point of the target part, which is included in the first three-dimensional image, with respect to each corresponding point of the target part included in the second three-dimensional image by removing magnetic field distortion included in the first three-dimensional image based on the magnetic field distortion vector and performing non-rigid registration between the first three-dimensional image from which the magnetic field distortion has been removed and the second three-dimensional image.

7. A non-transitory computer-readable recording medium having stored therein a magnetic field distortion calculation program causing a computer to execute:

a step of acquiring first and second three-dimensional images with different imaging timings that are acquired by imaging a target part of a subject performing with an MRI apparatus;

a step of extracting first and second shape-invariant regions corresponding to each other from the first and second three-dimensional images;

a step of acquiring a first deformation vector of each point on the first shape-invariant region with respect to each corresponding point on the second shape-invariant region by performing rigid registration between the first and second shape-invariant regions;

a step of acquiring a second deformation vector of each point on the first shape-invariant region of the first three-dimensional image with respect to each corresponding point on the second shape-invariant region of the second three-dimensional image by performing non-rigid registration between the first and second three-dimensional images in the first and second shape-invariant regions;

a step of calculating a magnetic field distortion vector, which represents relative magnetic field distortion between the first and second three-dimensional images, at each point on the first three-dimensional image based on the first and second deformation vectors; and a step of calculating a fourth deformation vector of each point of the target part, which is included in the first three-dimensional image, with respect to each corresponding point of the target part included in the second three-dimensional image by removing magnetic field distortion included in the first three-dimensional image based on the magnetic field distortion vector and performing non-rigid registration between the first three-dimensional image from which the magnetic field distortion has been removed and the second three-dimensional image.

\* \* \* \* \*